(12) United States Patent
Script (10) Patent No.: US 8,666,033 B2
(45) Date of Patent: Mar. 4, 2014

(54) PROVISION OF PRIVATE INFORMATION TO VOICE TELEPHONE CALL PARTIES

(76) Inventor: Michael H. Script, Buffalo, NY (US)

(*) Notice: Subject to any disclaimer, the term of this patent is extended or adjusted under 35 U.S.C. 154(b) by 1939 days.

(21) Appl. No.: 11/627,520

(22) Filed: Jan. 26, 2007

(65) Prior Publication Data

US 2008/0181374 A1    Jul. 31, 2008

(51) Int. Cl.
*H04M 1/64* (2006.01)

(52) U.S. Cl.
USPC ............. 379/88.02; 379/88.2; 379/88.18; 379/88.21; 455/456.1; 455/410; 455/411

(58) Field of Classification Search
USPC ........... 379/261, 280, 88.2, 85, 257, 88.19, 379/88.21, 99.02, 99.03, 102.01–102.05; 455/456.1, 410, 411; 340/545.1, 531, 340/3.1, 3.43; 709/224, 231
See application file for complete search history.

(56) References Cited

U.S. PATENT DOCUMENTS

| | | | |
|---|---|---|---|
| 1,958,896 A | | 5/1934 | Lesavoy et al. |
| 4,811,382 A | | 3/1989 | Sleevi |
| 4,850,007 A | | 7/1989 | Marino et al. |
| 5,321,740 A | | 6/1994 | Gregorek et al. |
| 5,557,658 A | * | 9/1996 | Gregorek et al. .......... 379/88.25 |
| 5,608,788 A | | 3/1997 | Demlow et al. |
| 5,652,784 A | | 7/1997 | Blen et al. |
| 5,880,770 A | | 3/1999 | Ilcisin et al. |
| 6,088,432 A | | 7/2000 | He |
| 6,385,308 B1 | | 5/2002 | Cphen et al. |
| 6,542,583 B1 | * | 4/2003 | Taylor ....................... 379/88.02 |
| 6,842,767 B1 | * | 1/2005 | Partovi et al. ................ 709/203 |
| 6,856,673 B1 | | 2/2005 | Banks et al. |
| 7,006,608 B2 | | 2/2006 | Seelig et al. |
| 7,039,170 B1 | * | 5/2006 | Sylvain ....................... 379/93.23 |
| 7,130,386 B2 | | 10/2006 | Morton |
| 7,130,392 B2 | | 10/2006 | Morton |
| 7,224,788 B1 | * | 5/2007 | Rhee et al. ............... 379/207.02 |
| 2001/0051517 A1 | | 12/2001 | Strietzel |
| 2003/0086558 A1 | | 5/2003 | Seelig et al. |
| 2003/0119528 A1 | * | 6/2003 | Pew et al. ..................... 455/456 |
| 2003/0130850 A1 | * | 7/2003 | Badt et al. ..................... 704/270 |
| 2003/0152198 A1 | * | 8/2003 | Price ............................ 379/67.1 |
| 2003/0223403 A1 | | 12/2003 | Higgins |
| 2003/0231749 A1 | | 12/2003 | Ansley et al. |
| 2004/0190692 A1 | * | 9/2004 | Gilbert ....................... 379/88.16 |
| 2005/0129216 A1 | * | 6/2005 | Tsujiuchi ................. 379/265.09 |
| 2005/0156733 A1 | * | 7/2005 | Choi et al. ..................... 340/525 |
| 2006/0088144 A1 | * | 4/2006 | Mitchell et al. ............ 379/88.17 |
| 2006/0233349 A1 | * | 10/2006 | Cooper .................... 379/265.06 |
| 2007/0263796 A1 | * | 11/2007 | Patel et al. ................. 379/88.01 |
| 2008/0274717 A1 | * | 11/2008 | Kim ............................. 455/411 |
| 2010/0121948 A1 | * | 5/2010 | Procopio ..................... 709/224 |

* cited by examiner

*Primary Examiner* — Joseph J Nguyen
(74) *Attorney, Agent, or Firm* — Walter W. Duft (57) ABSTRACT

A system and method for providing private information content to a voice telephone call parties prior to, during or following a call. In one aspect, the system and method may be implemented in a voice telephone communication apparatus that is adapted to hold information content in an information store on behalf of the call party, gather information that is private to the call party and add it to the information store as part of the information content, and retrieve the information content from the information store and present it to the call party in response to an information presentation initiation action. In another aspect, the system cooperates with a premises or equipment monitoring system, such as a security system, to provide monitoring information to a telephone call party.

16 Claims, 6 Drawing Sheets

| OBJECT | 24 HOUR STATUS | | | |
|---|---|---|---|---|
| CAR | NO MOVEMENT | | | |
| REFRIGERATOR | AVERAGE 47° | | | |
| KITCHEN LIGHT | O<br>18:00 | X<br>19:50 | O<br>22:00 | |
| BACK DOOR | O<br>10:00 | X<br>17:00 | | |
| BASEMENT LIGHT | NO ACTIVITY | | | |
| FURNACE | 67°<br>08:00 | 68°<br>12:00 | 70°<br>16:00 | 64°<br>22:00 |

PROVISION OF PRIVATE INFORMATION TO VOICE TELEPHONE CALL PARTIES

BACKGROUND OF THE INVENTION

1. Field of the Invention

The invention relates generally to voice telephone communication, and more particularly to the provision of information content to a call party prior to, during or following a call. The invention further relates to the provision of private information content, including security information, to mobile device users.

2. Prior Art

By way of background, conventional telephone service contemplates the provision of audible queues that are associated with call-related events. Well known examples include dial tones, ringback tones, and busy signals, all of which are played to calling parties as part of the call setup process. Dating back to at least the 1930's, proposals have been made to provide generalized information content to telephone call parties in addition to, or in lieu of, traditional audible queues. For example, instead of generating a dial tone or a ringback tone on behalf of a calling party, information such as advertisements, political content, stock market information, commodity pricing information, news, weather or other data can be presented. The information stream is discontinued when the called party answers to allow normal conversation to take place. The information content is typically maintained in a database that is accessible from the telephone network by a telephone service provider. The service provider determines how and when the information will be fetched from the database and introduced into the circuit for playback. The telephone service provider (or other third party) also programs the information content stored in the database, although some systems allow subscribers to select information categories that are of interest.

What is lacking in the prior art is an information provision technique whereby a voice telephone call party can maintain a personal database containing private information specific to and selected by that party. A system of this type would be of great benefit to persons who wish to receive information about conditions of interest in or around the person's home, place of business, motor vehicle, etc., including but not limited to events reported by security monitoring systems. It is to improvements in this area that the present invention is directed.

BRIEF SUMMARY OF THE INVENTION

The foregoing problems are solved and an advance in the art is provided by a system and method for providing private information content to a voice telephone call party prior to, during or following a call. According to one exemplary embodiment, a system and related method are implemented in a voice telephone communication apparatus that is adapted to hold information content in an information store on behalf of the call party, gather information that is private to the call party and add it to the information store as part of the information content, and retrieve the information content from the information store and present it to the call party in response to an information presentation initiation action. The communication apparatus may comprise one of a mobile telephone, a land-line telephone and a computer having voice communication capability. The information presentation initiation action may comprise the call party initiating a telephone call. The information may have an associated information priority level. If the information has a requisite priority, the information can be presented immediately, even if a telephone call connection has been established and a conversation is taking place. For information of lower priority, the information may be presented either prior to or following the telephone call being connected.

In another aspect, the information presentation system cooperates with a monitoring system to provide monitoring information to a remote device. Although the information presentation system may be implemented in a mobile telephone, a land-line telephone or a computer having voice communication capability, it may also be disposed in a telephone network. The monitoring system could be of any suitable type, including a security or premises monitoring system.

BRIEF DESCRIPTION OF THE SEVERAL VIEWS OF THE DRAWINGS

The foregoing and other objects and features of the invention will become more fully apparent from the following description, taken in conjunction with the accompanying drawings. Understanding that these drawings depict only typical embodiments of the invention and are, therefore not to be considered limiting of its scope, the invention will be described with additional specificity and detail through use of the accompanying drawings in which.

DETAILED DESCRIPTION OF EXEMPLARY EMBODIMENTS

The following detailed description of exemplary embodiments of the present invention, as represented in FIGS. 1-9, is not intended to limit the scope of the invention, as claimed, but is merely representative of the presently preferred embodiments thereof. The presently preferred embodiments of the invention will be best understood by reference to the drawings, wherein like parts are designated by like numerals throughout.

Figure 1:
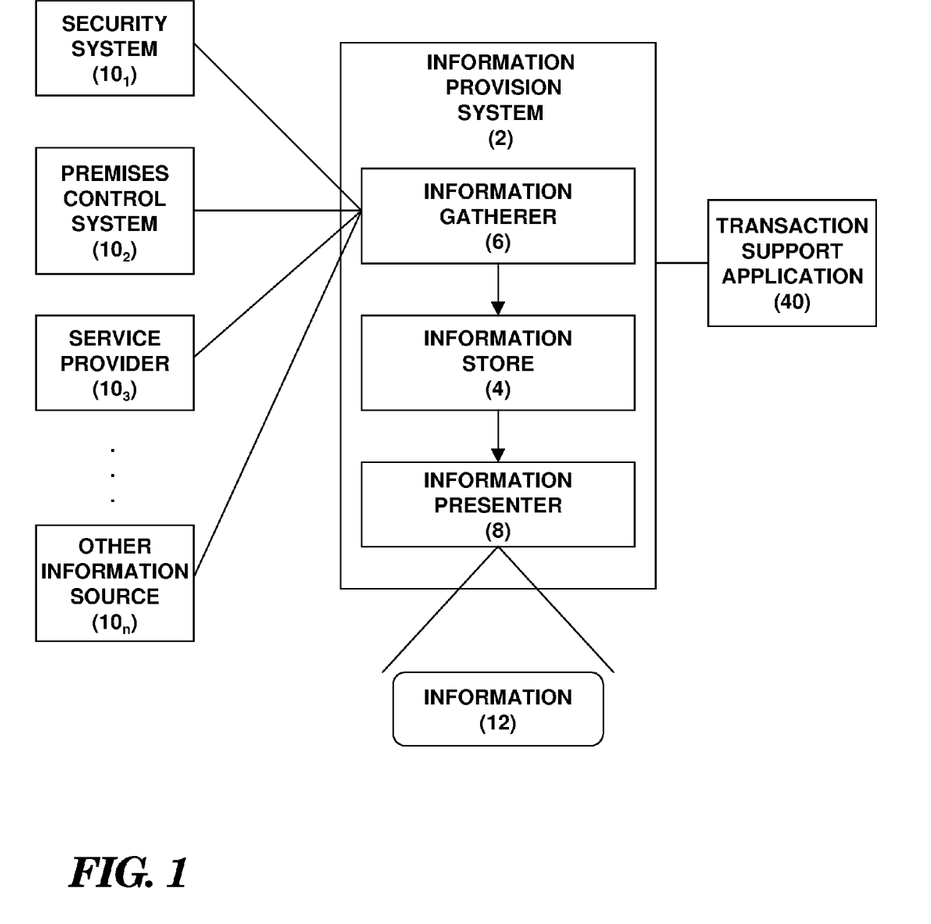
FIG. 1 is a functional block diagram showing a telephone information provision system in combination with plural information sources.
Figure 2:
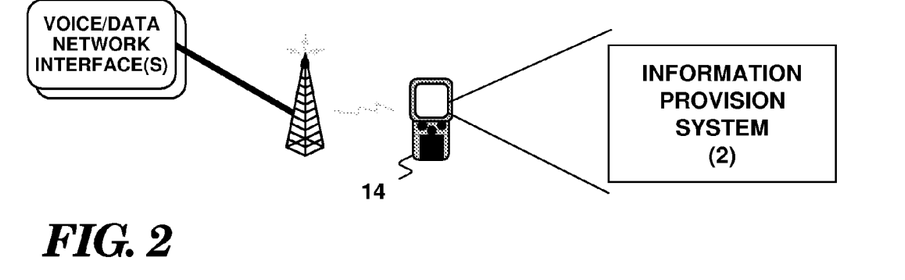
FIG. 2 is a diagrammatic illustration of an exemplary implementation of the information provision system of FIG. 1.
Figure 3:
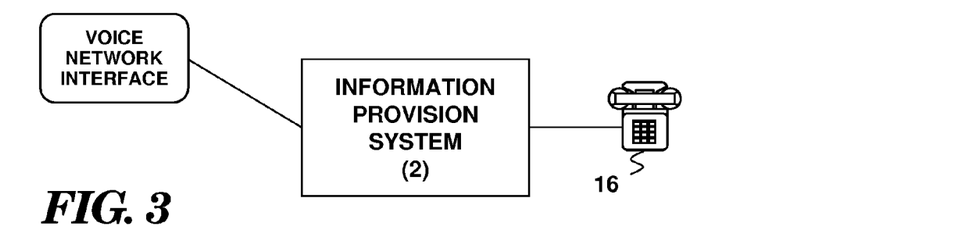
FIG. 3 is a diagrammatic illustration of another exemplary implementation of the information provision system of FIG. 1.
Figure 4:
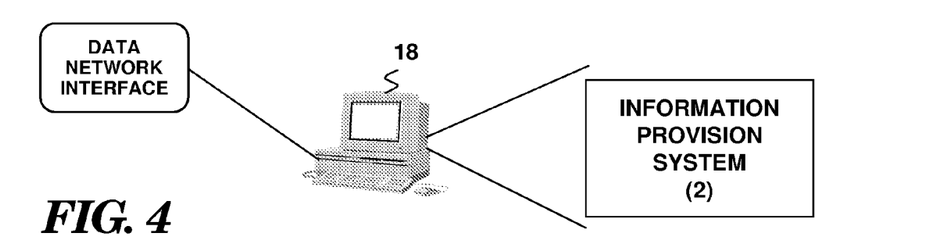
FIG. 4 is a diagrammatic illustration of another exemplary implementation of the information provision system of FIG. 1.
Figure 5:
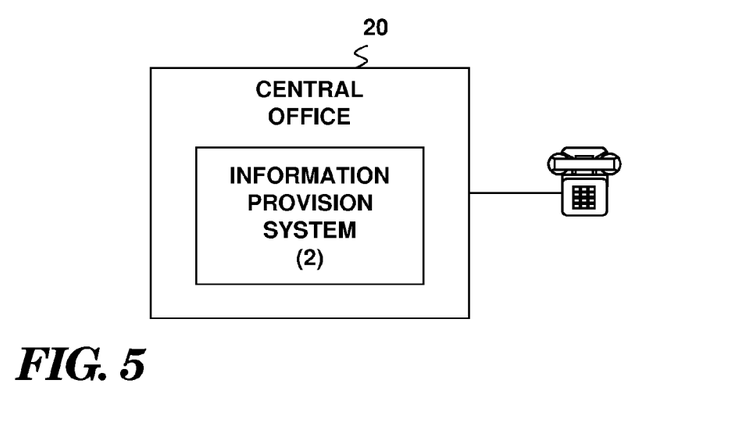
FIG. 5 is a diagrammatic illustration of another exemplary implementation of the information provision system of FIG. 1.

Turning now to FIG. 1, a telephone information provision system 2 is adapted to provide private information content to a telephone call party. The system 2 includes an information store 4, an information gatherer 6 and an information presenter 8. The system 2 is adapted to obtain information content from one or more information sources $10_1 \ldots 10_n$ and present a subset 12 of that information via a voice telephone communication apparatus to a call party either prior to, during or following a call connection. As shown in FIGS. 2-5, the information provision system 2 may be physically located in any of a variety of host systems, including within a wireless (e.g., cellular) telephone 14 (FIG. 2), as an adjunct to a landline POTS (Plain Old Telephone Service) telephone 16 (FIG. 3), in a computer 18 having VoIP (Voice over Internet Protocol) voice communication capability (FIG. 4), or within a telephone network, such as a network service provider's central switching office 20 (FIG. 5). It will be appreciated that the wireless telephone 14 of FIG. 2 could be embodied in a mobile device that also performs other functions, such as web browsing, email communication, music downloading and playback, image acquisition, gaming, etc.

As can be seen in FIG. 1, the information store 4 is adapted to hold information content on behalf of the call party. It may be implemented using any suitable data storage hardware capable of supporting read/write operations, including solid state devices such as random access or flash memory, and media storage devices such as magnetic or optical disk systems. The information store 4 may further include conventional firmware or software interfaces, such as a memory management system, a buffer management system, a file system, a database management system, etc., for manipulating the information content.

The information gatherer 6 is adapted to gather information that is private to the call party and add it to the information store 4 as part of the information content therein. It may be implemented in hardware, firmware or software. To obtain information for the information store 4, the information gatherer 6 communicates with one or more external information sources $10_1 \ldots 10_n$. This communication may be performed using any suitable data communication technology, including HTTP (HyperText Transfer Protocol), email, SMS (Short Message Service), MMS (Multimedia Message Service), automated voice messages, etc. The communication pathway may be wireless, wireline or any combination thereof. Exemplary information sources illustrated in FIG. 1 include a security system $10_1$, a home control system $10_2$, and a service provider $10_3$. In addition to obtaining information from the external information sources $10_1 \ldots 10_n$, the information gatherer 6 could also be configured to retrieve local information, as by controlling one or more local information gathering devices (e.g., camera, audio sensor, motion sensor, environmental sensor, etc.). The information gatherer 6 may add information content to the information store 4 in any suitable manner that is consistent with the latter's hardware implementation and its associated firmware and/or software interface(s).

The security system $10_1$ may be any security system capable of detecting and reporting security events. One exemplary security system is disclosed in commonly owned U.S. Pat. No. 7,113,091, entitled "Portable Motion Detector And Alarm System." The contents of U.S. Pat. No. 7,113,091 are hereby incorporated in their entirety by this reference. The security system disclosed in the referenced patent is portable and features motions sensors, environmental sensors, and image capture sensors that can be placed (temporarily or permanently) at any location where security monitoring is required, including in or around premises, vehicles, equipment, etc. The system can be implemented with a base station that receives information from the various sensors. The sensors have unique identifiers and the base station can be programmed to correlate each sensor's identifier with an object identifier (e.g., "front door," back door," "front hall," "liquor cabinet," etc.). When a sensor reports information to the base station it will provide its unique identifier and the base station can determine the physical location from where the sensor information was generated. Using the environmental sensors, the base station can track environmental information (e.g. temperature, humidity, carbon monoxide levels, etc.) at known locations (e.g., kitchen, living room, bedrooms, etc.). Using the motion sensors, the base station can track security events at known locations (e.g., back door—knock, front door—open). Using the image capture sensors, the base station can obtain images at known locations, such as locations where the environmental sensors have reported unusual information (e.g., extremely high temperatures) or the motion sensors have reported disturbances (e.g., a knock on a door). All of this information can be tracked by the base station. Moreover, some or all of the information can be reported by the base station to a remote administrative security center.

In order to acquire the information tracked by the base station, the information gatherer 6 may communicate directly with the security system $10_1$ or indirectly therewith via an administrative security center (not shown) to which the security system makes reports. For ease of description, the security system $10_1$ will be hereinafter understood to include any administrative security system that may be present. The information gatherer 6 may either actively poll the security system $10_1$ for information, or it may passively receive information therefrom. This information can be maintained in any suitable fashion by the security system $10_1$, such as in a database, and a copy of all or a portion thereof may be provided periodically to the information gatherer 6. The active polling mode of communication may be implemented if the security system $10_1$ implements a suitable server interface that is responsive to remote queries, such as a web browser, a remote login function, etc., with appropriate authentication preferably being required. The information gatherer 6 will then implement a client application that is programmed to periodically login to the security system $10_1$ and retrieve new information. The passive mode of communication may be implemented if the security system $10_1$ is programmed with an application that is aware of the information provision system 2, and which periodically reports new information to the information gatherer 6, such as by email, text messages, voice messages. This will require knowledge on the part of the security system $10_1$ as to the kind of information that the information gatherer 6 wishes to receive, but such knowledge can be provisioned using any conventional provisioning techniques. Indeed, the security system $10_1$ will likely already be programmed to forward certain information (e.g., high priority security alerts) to third parties such as emergency service providers, etc.

The premises control system $10_2$ may be any suitable system that monitors equipment operating at a premises, including homes and commercial buildings. The equipment to be monitored may include heating and ventilation systems, electrical systems, appliances, etc. The kind of information that may be tracked could thus include heating/air conditioning malfunctions, electrical malfunctions, appliance malfunctions, etc. As in the case of the security system $10_1$, the information gatherer 6 may actively poll the premises control system $10_2$ for information, or it may act as a passive receiver of information. The same communication methodologies described above may thus also be used.

The service provider $10_3$ may be any suitable entity, such as a bank, brokerage, etc. The kind of information that may be tracked could include bank account data, stock portfolio information, etc. As in the case of the security system $10_1$ and the premises control system $10_2$, the information gatherer 6 may actively poll the service provider $10_3$ for information, or it may act as a passive receiver of information. The same communication methodologies described above may thus also be used.

The information presenter 8 is adapted to retrieve information content from the information store 4 and present it to the call party in response to an information presentation initiation action. The information presentation initiation action may be call-related or non-call-related. In the former case, the information may be presented in lieu of a dial tone or a ringback tone. In the latter case, the information may be presented in response to the call party pushing a button or sequence of buttons on their telephone, thus allowing the call party to retrieve the information without having to make a call. The information presenter 8 may retrieve information content from the information store 4 in any suitable manner that is consistent with the latter's hardware implementation and its associated firmware and/or software interface(s).

The information presenter 8 may present information in any suitable form, including audibly as a voice message or visually using graphics or text. For example, information received from the security system $10_1$ or the premises control system $10_2$ could be presented as an audible message that announces "The temperature in your home is 70 degrees," or "The kitchen circuit breaker tripped," or "The house has lost main power." The same messages could be presented graphically using icons and text, or textually using pure text. The service provider $10_3$ could present messages such as bank account balances, stock portfolio balances, trading recommendations, etc. Note that the output format will normally dictate the format of the information content maintained in the information store 4. If a voice presentation is required, the information can be stored as digitized voice data or as text data that can be converted to voice information by the information presenter 8. If a visual presentation is required, the information can be stored as graphics or text data. One visual presentation approach would be to present the information content in tabular form in which objects of interest are paired with associated properties representing current object status and possibly also including historical data. The latter approach is illustrated by table 22 in FIG. 6, where the information presenter 8 displays historical data for a set of objects based on information gathered from the security system $10_1$ or the home control system $10_2$ over a twenty-four hour period. To facilitate this type of presentation, the information store 4 could be implemented as a database of objects representing an inventory of assets that a user desires to track. As new information is gathered relative to the assets being tracked, the information gatherer 6 can supplement the object database. The historical time period over which information is tracked is preferably user-selectable.

The information presenter 8 is further programmed to control the timing of the information presentation. It will be appreciated that the information may be presented at any time prior to a call connection being established, as well as during a call connection and also following a call connection. In the pre-connection situation, the information presenter 8 will be triggered by the call party pressing a button, such as the last digit of a telephone number on a POTS telephone or the "Send" button on a cellular telephone. The information may be presented until the information presenter 8 detects that a call connection has been established, at which point the presentation may be terminated or suspended. It will be appreciated that the call party will normally be receptive to receiving information prior to call connection establishment because they will have performed an action (e.g., pressing the button) that is expected to produce a result. This is not the case in the post-connection situation because when a call is ended the call party will normally hang up. In order to provide post-connection information, the information presenter 8 will thus normally need to alert the call party that the information will be presented. This will preferably be done prior to the call connection and may include prompting the call party to elect whether to receive information following call termination.

The provision of information during a call connection will normally not take place because the call party will typically be engaged in conversation. However, there may be times when the information is important enough to warrant breaking in on the conversation, such as in response to an alert from the security system $10_1$ or the premises control system $10_2$. In order to gauge the importance of the information, it can be stored by the information gatherer 6 in association with a priority indicator in the information store 4. This will provide a priority notification to the information presenter 8 if the information presenter is adapted to inspect the priority indicators of newly added information content to determine the information priority level. If the information has a requisite priority level, it can be designated for immediate presentation regardless of call state. Alternatively, instead of storing a priority indicator, the information gatherer 6 could notify the information presenter 8 by sending a message upon receipt of the high priority information. Note that the handling of high priority information will not normally be an issue unless the call party is engaged in a telephone call. When the call party is not so engaged, an information source, such as the security system $10_1$ or the premises control system $10_2$, would normally attempt to provide high priority information by placing a voice call or page to the call party in real time. This technique will not suffice when the call party is engaged in a telephone call because presentation of the high priority information could be delayed indefinitely. Thus, in response to the information source detecting a call in progress, such as by receiving a busy signal, the high priority information can be provided to the information gatherer 6 along with a high priority indicator, which will trigger the information presenter 8 to perform the call cut-in. High priority information may also arrive when a user is performing other functions, such as listening to music. Information cut-in should also be performed in this situation, such as by muting the music and alerting the user that high priority information has been received. If an attempt to is made to present the high priority information by initially placing a telephone call to the user, this would result in the music being muted because this is a conventional feature found in currently available music player-cellular telephone hybrid devices.

When the information presenter 8 performs normal information presentation prior to or following a call connection, it can retrieve the information from the information store 6 in any desired order. In some cases, the information presenter 8 may present information from different information sources in the order it is received into the information store (i.e., using FIFO ordering). In other cases, information from different information sources may be grouped by information category. The information presenter 8 may then present information from different categories either on a random basis or based on category preference selections made by the call party. In order to support the latter functionality, the information provision system 2 may implement a suitable interface that allows the operational characteristics of the system to be adjusted. For example, information from the security system $10_1$ could be presented first, followed by information from the premises control system $10_2$, followed by information from the service provider information $10_3$, etc.

Figure 7:
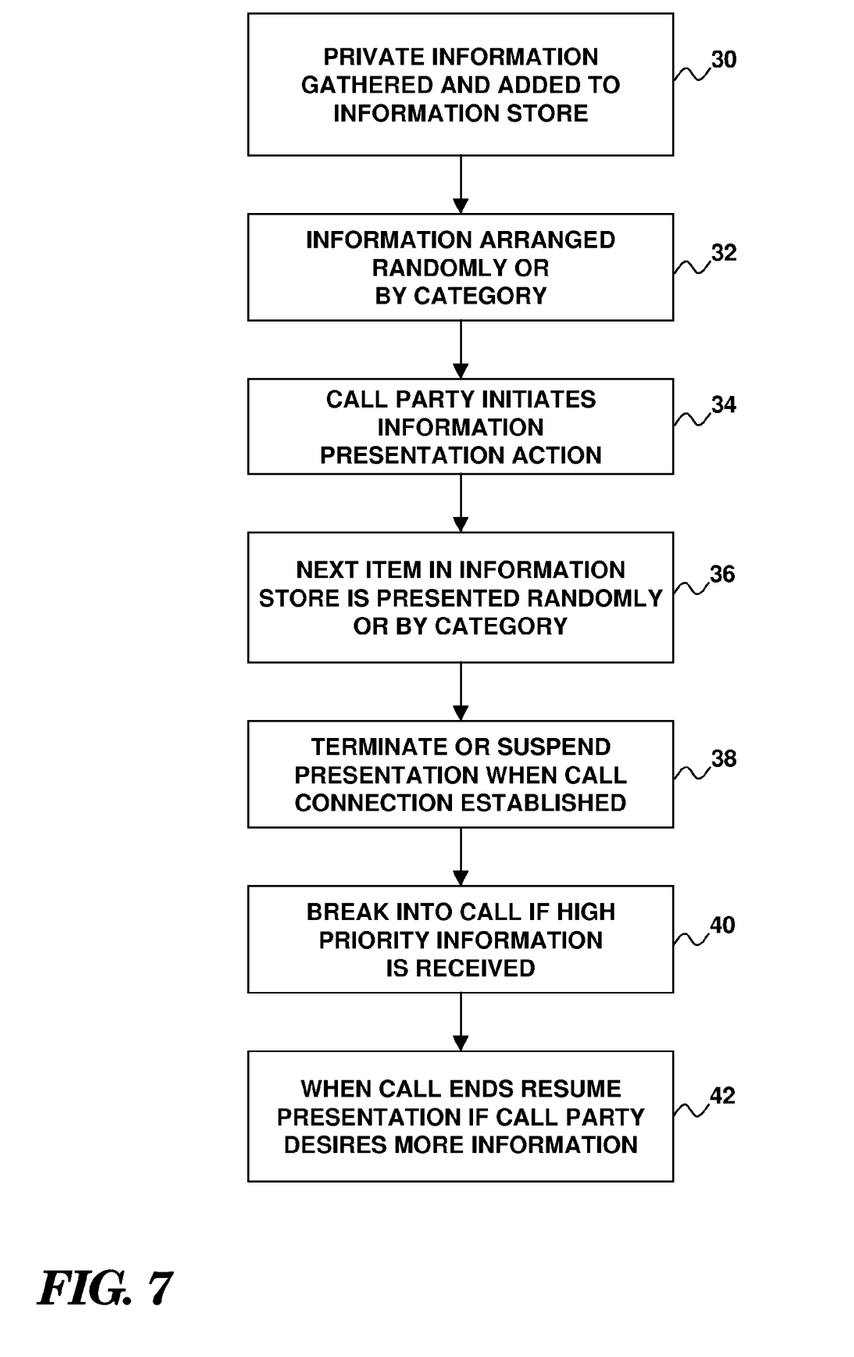
FIG. 7 is a flow diagram illustrating exemplary operations of the information provision system of FIG. 1.

FIG. 7 presents a flow diagram of some of the above-described operations of the information provision system 2. Block 30 represents the information gatherer 6 obtaining private information from the information sources $10_1 \ldots 10_n$ adding to the information store 4. Block 32 represents the information gatherer 6 arranging the information in the information store 4 randomly or by category. Block 34 represents the call party initiating an information presentation action. Block 36 represents the information presenter 8 selecting the next information item in the information store 4, or in a category of information, and presenting the item. Block 38 represents the information presenter terminating or suspending the information presentation when a call connection is established. Block 40 represents the information presenter 8 breaking into a call in order to present high priority information. Block 42 represents the call presenter 8 resuming information presentation following call connection termination if the call party desires more information.

As an enhancement to the information provision system 4, an additional function could be provided that would allow a call party to access the information sources $10_1 \ldots 10_n$ and make changes to information databases therein. The call party would thus be able to create transactions that access interfaces provided by the information sources $10_1 \ldots 10_n$. A transaction support application 40 (see FIG. 1) could be provided in the information provision system 2 that is either manually initiated by the call party, or triggered by the information presenter when certain types of information are presented, such as warnings of low back account balances, etc. Another capability that could be provided by the information provision system 2 is the deletion of information in the information store 4 following presentation, as well as periodic scrubbing of the entire information store for security purposes. For example, the information store 4 could be scrubbed each time the device that hosts the information provision system 2 is powered on or off. Scrubbing could also be performed after an elapsed time interval. This would help prevent unauthorized access to information in the event of loss or theft (e.g., loss or theft of a cell phone that implements the information provision system 2). Note that the deletion and scrubbing of information content in the information store 4 will not permanently delete all instances of the information if the information store only maintains a copy or view of the information, and the information sources $10_1 \ldots 10_n$ act as primary sources. The information sources $10_1 \ldots 10_n$ can also be used for recreating the contents of the information store 4 from one information provision system 2 to another. This is advantageous when the information provision system 2 is implemented in a mobile device because the owner can easily transfer the system functionality from a first device to a second device.

Figure 8:
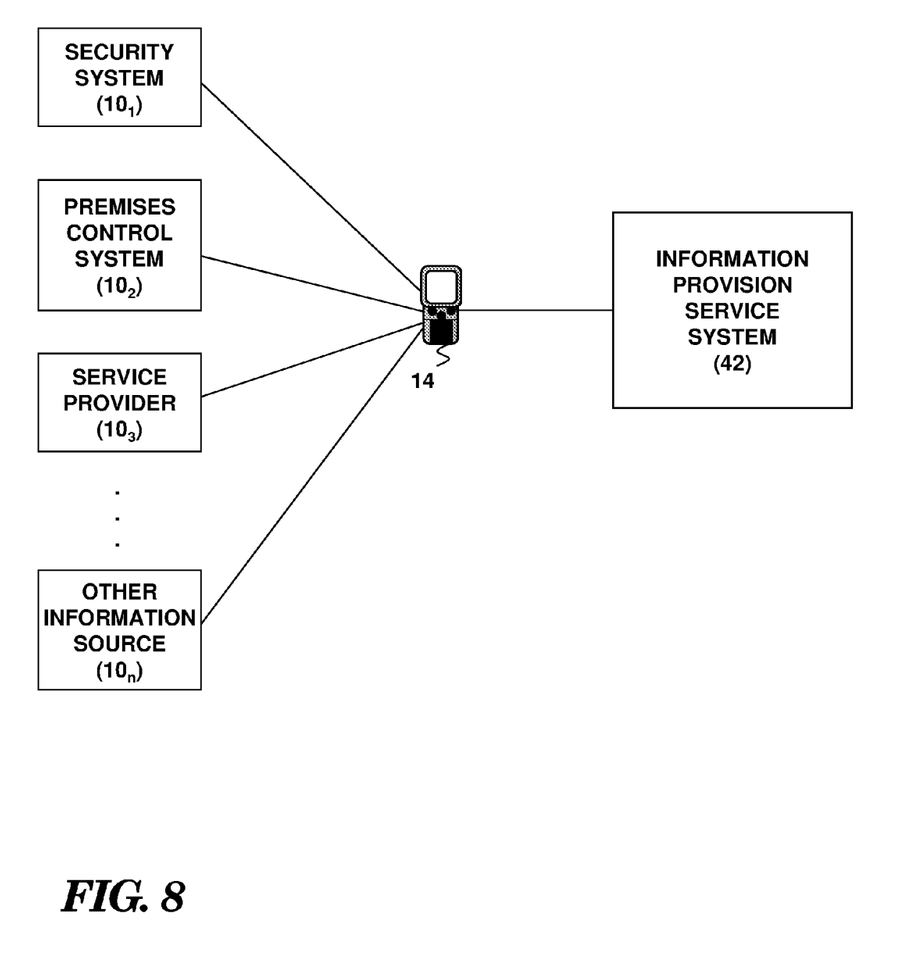
FIG. 8 is a functional block diagram showing a mobile device implementing the information provision system of FIG. 1 in combination with an information provision service system and plural information sources.
Figure 9:
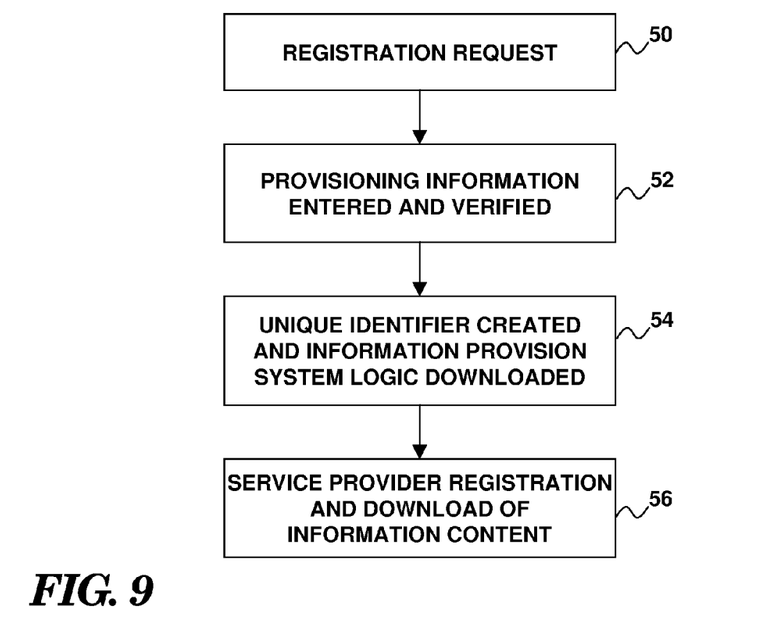
FIG. 9 is a flow diagram illustrating an exemplary information provision service registration sequence.

Turning now to FIGS. 8 and 9, one way that the information provision system 2 could be implemented in a mobile device (such as the wireless telephone 14 of FIG. 2) is to have the owner register the device with an information provision service system 42 (e.g., a system that administers the information provision system 2 as a service). Block 50 of FIG. 9 represents the registration request operation. In block 52, the owner of the mobile device is prompted for provisioning information and this information is entered and verified by the service system 42. The service system 42 may then create a unique identifier for the mobile device and download information provision system logic to the mobile device (i.e., logic that implements the information store 4, the information gatherer 6, and the information presenter 8). Block 54 of FIG. 9 represents these operations. The foregoing process could be initiated in any suitable manner, such as by using the mobile device to dial a telephone number or by accessing a website. Note that the unique identifier could be static or dynamic (e.g., using a code-hopping algorithm or the like), and could be paired with a retinal scan, a fingerprint or other biometric information (assuming the mobile device is equipped to capture such information) that is preferably encrypted to prevent unauthorized use. In block 56 of FIG. 9, the owner of the mobile device optionally registers the mobile device with the information sources $10_1 \ldots 10_n$, following which the information gatherer 6 may begin gathering information content. If desired, registration with the information sources $10_1 \ldots 10_n$ could also be handled by the service provider 42 following the owner's selection of a set of available information sources.

Figure 6:
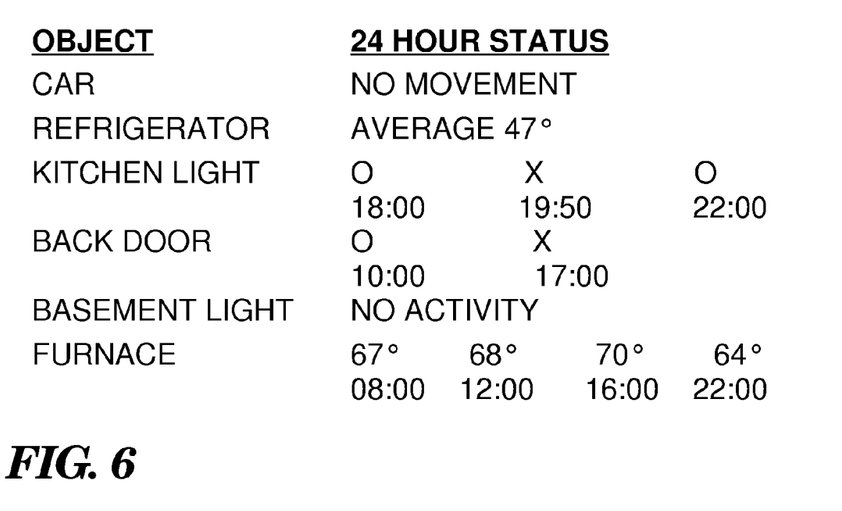
FIG. 6 is a table showing an exemplary information presentation by the information provision system of FIG. 1.
Figure 10:
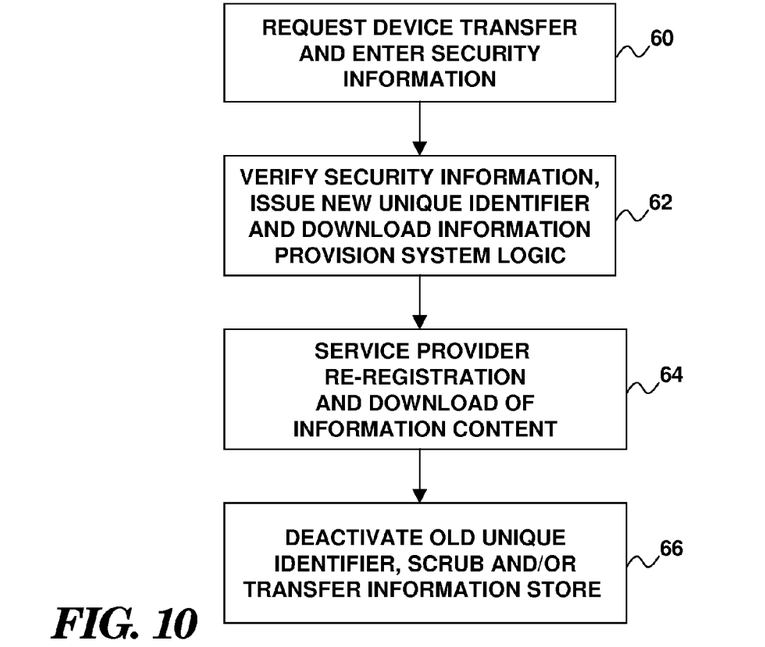
FIG. 10 is a flow diagram illustrating an exemplary information provision service transfer sequence.

If the mobile device is thereafter lost or stolen and the owner obtains a replacement device, the owner may request that the information provision system 2 be transferred to the replacement device and enter appropriate security information (e.g., by scanning in their biometric information, if used). This operation is shown by block 60 in FIG. 10. The service system 42 will verify the security information (e.g., by asking the owner a few contract-related questions), following which a new unique identifier may be issued and the information provision system logic may be reconstituted on the replacement device. This operation is shown by block 62 in FIG. 10. As shown in block 64 of FIG. 10, the owner may also be required to reregister the replacement device with the information sources $10_1 \ldots 10_n$. The service provider system 42 may then deactivate the old unique identifier associated with the old mobile device. The old device's information store 4 could also be scrubbed and/or transferred to the replacement device by the service provider system 42 or the information sources $10_1 \ldots 10_n$ (as described above). These operations are shown in block 66 of FIG. 10. One reason that transfer of the information store 4 might be desirable is if the information provision system 2 maintains unique information that can not be obtained from the information sources $10_1 \ldots 10_n$. Such unique information could include historical data tracked by the information provision system 2 but not by the information sources $10_1 \ldots 10_n$ (such as twenty-four hour status information as shown in FIG. 6), or records of responsive actions taken by a user following the presentation of information (e.g., calls or information forwarding to emergency service providers or other third parties following a security event, etc.).

It will be appreciated that in lieu of the service system 42 performing the various operations ascribed to that system above, the same operations could be performed by one or more of the information sources $10_1 \ldots 10_n$ acting as service systems alone or in conjunction with the service provider system 42.

Accordingly, a system and method for providing private information content to voice telephone call parties has been shown and described. While the invention has been described in conjunction with various embodiments, they are illustrative only, and it will be appreciated that many alternatives, modifications and variations will be apparent to persons skilled in the art in light of the foregoing detailed description. The invention is intended to embrace all such alternatives, modifications and variations falling with the spirit and broad scope of the appended claims and their equivalents.

What is claimed is:

1. In a voice telephone communication apparatus, a system for providing private information content to a voice telephone call party, comprising:

an information store adapted to hold information content on behalf of said call party;

an information gatherer adapted to gather information that is private to said call party and add it to said information store as part of said information content; and an information presenter adapted to retrieve said information content from said information store and present it to said call party in response to said call party initiating a voice telephone call.

2. A system in accordance with claim 1, wherein said communication apparatus comprises one of a mobile telephone, a land-line telephone, a computer having voice communication capability, or an entity within a telephone network.

3. A system in accordance with claim 1, wherein said information is presented in lieu of a dial tone or a ringback tone.

4. A system in accordance with claim 1, wherein said information gatherer is adapted to determine an information priority level.

5. A system in accordance with claim 4, wherein said information presenter is adapted to determine whether immediate presentation of said information is required due to said information having a requisite priority level.

6. A system in accordance with claim 1, wherein said information presenter is adapted to present said information either prior to or following said telephone call being connected.

7. A system in accordance with claim 5, wherein said information presenter is adapted to present said information while said telephone call is connected in response to said information gatherer determining that immediate presentation of said information is required.

8. A system in accordance with claim 1, further including a transaction initiator adapted to initiate a transaction on behalf of said call party based on said information presentation.

9. A method implemented in a voice telephone communication apparatus for providing private information content to a voice telephone call party, comprising:

holding information content in an information store on behalf of said call party;

gathering information that is private to said call party and adding it to said information store as part of said information content; and retrieving said information content from said information store and presenting it to said call party in response to said call party initiating a voice telephone call.

10. A method in accordance with claim 9, wherein said communication apparatus comprises one of a mobile telephone, a land-line telephone, a computer having voice communication capability, or an entity within a telephone network.

11. A method in accordance with claim 9, wherein said information is presented in lieu of a dial tone or a ringback tone.

12. A method in accordance with claim 9, wherein a priority level of said information is determined.

13. A method in accordance with claim 12, wherein an immediate presentation of said information is made upon said information being determined to have a requisite priority level.

14. A method in accordance with claim 9, wherein said information is presented either prior to or following said telephone call being connected.

15. A method in accordance with claim 13, wherein said information is presented while said telephone call is connected in response to said information requiring immediate presentation.

16. A method in accordance with claim 9, further including initiating a transaction on behalf of said call party based on said information presentation.

* * * * *